US012142792B2

(12) United States Patent
Liu et al.

(10) Patent No.: US 12,142,792 B2
(45) Date of Patent: Nov. 12, 2024

(54) POWER BATTERY, BUSBAR COMPONENT OF POWER BATTERY AND METHOD THEREOF

(71) Applicant: SVOLT ENERGY TECHNOLOGY COMPANY LIMITED, Jiangsu (CN)

(72) Inventors: Xuewen Liu, Jiangsu (CN); Fangzhe Li, Jiangsu (CN)

(73) Assignee: SVOLT ENERGY TECHNOLOGY COMPANY LIMITED, Jiangsu (CN)

( * ) Notice: Subject to any disclaimer, the term of this patent is extended or adjusted under 35 U.S.C. 154(b) by 281 days.

(21) Appl. No.: 17/429,356

(22) PCT Filed: Dec. 17, 2020

(86) PCT No.: PCT/CN2020/137392
§ 371 (c)(1),
(2) Date: Aug. 9, 2021

(87) PCT Pub. No.: WO2021/129523
PCT Pub. Date: Jul. 1, 2021

(65) Prior Publication Data
US 2022/0352603 A1 Nov. 3, 2022

(30) Foreign Application Priority Data
Dec. 24, 2019 (CN) .......................... 201911349067.5

(51) Int. Cl.
*H01M 50/516* (2021.01)
*H01M 50/204* (2021.01)
(Continued)

(52) U.S. Cl.
CPC ....... *H01M 50/516* (2021.01); *H01M 50/204* (2021.01); *H01M 50/502* (2021.01);
(Continued)

(58) Field of Classification Search
None
See application file for complete search history.

(56) References Cited

U.S. PATENT DOCUMENTS

| 2011/0223468 A1* | 9/2011 | Ferber, Jr. | ............... B60L 50/64 29/401.1 |
| 2014/0017533 A1 | 1/2014 | Nishihara et al. | |
| 2015/0072211 A1* | 3/2015 | Nakamura | .......... H01M 50/509 429/121 |

FOREIGN PATENT DOCUMENTS

| CN | 106455303 A | 2/2017 |
| CN | 208173687 U | 11/2018 |

(Continued)

OTHER PUBLICATIONS

Machine Translation of CN 109103405A (Year: 2018).*

*Primary Examiner* — Gregg Cantelmo
(74) *Attorney, Agent, or Firm* — Samson G. Yu

(57) ABSTRACT

Disclosed are a power battery, a busbar component of the power battery and a method thereof. The busbar component comprises a busbar assembly. The busbar assembly comprises a busbar body, a first insulating layer and a second insulating layer. The busbar body is connected with one side of the first insulating layer facing a battery cell module, is integrated with a sampling line, and the sampling line is manufactured by a mechanical cutting and unloading process. The second insulating layer is attached to the first insulating layer and covers the sampling line, and the second insulating layer and the busbar body are on a same side of the first insulating layer and are arranged in a staggered manner. The cost is lowered, the process cycle of product is shortened, the production efficiency is improved, the applicability gets wider, the production process and the assembling process are simplified.

19 Claims, 3 Drawing Sheets

(51) Int. Cl.
*H01M 50/502* (2021.01)
*H01M 50/505* (2021.01)
*H01M 50/519* (2021.01)
*H01M 50/522* (2021.01)
*H01M 50/524* (2021.01)
*H01M 50/526* (2021.01)

(52) U.S. Cl.
CPC ....... *H01M 50/505* (2021.01); *H01M 50/519* (2021.01); *H01M 50/522* (2021.01); *H01M 50/524* (2021.01); *H01M 50/526* (2021.01)

(56) References Cited

FOREIGN PATENT DOCUMENTS

| | | |
|---|---|---|
| CN | 109103405 A | 12/2018 |
| CN | 109830640 A | 5/2019 |
| CN | 111435725 A | 7/2020 |

\* cited by examiner

POWER BATTERY, BUSBAR COMPONENT OF POWER BATTERY AND METHOD THEREOF

TECHNICAL FIELD

The present disclosure relates to the technical field of batteries, in particular to a power battery, a busbar component of the power battery and a method thereof.

BACKGROUND

The design trend of a current power battery usually takes lightweight and low cost into consideration. A module is a critical component of a battery pack, and the weight and the cost of the module in one battery pack are usually the highest, thus, it is of great importance for weight losing and cost lowering design of the components and parts of the module of the battery pack.

A centralized busbar assembly in the related art usually includes an upper cover, a FPC (Flexible Printed Circuit), a busbar and a busbar bracket. The FPC and the busbar are welded to collect a voltage and a temperature of a battery cell of the battery module, such that the voltage and the temperature are transferred to a battery management system (i.e., BMS). And the busbar and the battery cell are welded to achieve electric connection between the battery cells, such that a current is transmitted.

The upper cover is buckled to the busbar bracket, such that the FPC and the busbar are coated between the upper cover and the busbar bracket, thereby insulating and isolating the FPC from the battery cell and other apparatuses. The busbar bracket is placed and fixed on a top cover of the battery cell to play roles of integrating, fixing and supporting the upper cover, the FPC and the busbar.

However, as far as the centralized busbar assembly in the prior art is concerned, the upper cover and the busbar bracket are usually heavier plastics, thereby leading to great height, large weight and complex structure of the module of the battery pack. Furthermore, as it is needed to cost a lot of manpower and time, it is relative complex to design and manufacture the busbar bracket, and the processing period of a product is longer and the cost of the product is higher.

SUMMARY

On that account, the present disclosure aims to provide a busbar component of a power battery. The busbar component of the power battery can reduce the height of a battery cell module to achieve lightweight and cost reduction, shorten the processing period of the product and improve the production efficiency. The busbar component is simple in structure and wider in application range, the production process and the assembling process are simplified, and furthermore, environmental pollution can be further prevented.

The present disclosure further provides a method for processing the busbar component of the power battery.

The present disclosure further provides a power battery with the busbar component.

In order to achieve the purpose, the technical scheme of the present disclosure is realized as follows:

According to a first aspect of the present disclosure, the power battery includes a battery cell module and a busbar component, wherein the busbar component and the battery cell module are connected. The busbar component includes a busbar assembly. The busbar assembly includes a busbar body, a first insulating layer and a second insulating layer, wherein the busbar body is connected with a side of the first insulating layer facing a battery cell module. The first insulating layer is provided with a reserved hole. The side of the first insulating layer facing the battery cell module is integrated with a sampling line, and the sampling line is manufactured by a mechanical cutting and unloading process. The second insulating layer is attached to the first insulating layer and covers the sampling line, and the second insulating layer and the busbar body are on a same side of the first insulating layer and are arranged in a staggered manner. The reserved holes and the busbar body are arranged correspondingly.

According to the busbar component of the power battery in the embodiment of the present disclosure, the first insulating layer, the busbar body and the second insulating layer are installed together to the effects of fixing and insulating, and the upper cover and the busbar bracket in the related art are omitted. Therefore the height of the battery cell module is reduced, and the busbar component is light and simple in structure, and wider in application range. The processing period of the product can be shortened, and the labor cost of a product scheme design is lowered. The busbar component is higher in production efficiency and lower in comprehensive cost. Besides, the sampling line is packaged and protected by the first insulating layer and the second insulating layer directly, and the expensive FPC protective film is canceled, such that the production and assembly processes are simplified, the cost is lower and environmental pollution can be avoided by means of a mechanical cutting and unloading process.

In addition, the busbar component of the power battery according to the embodiment of the present disclosure further has the additional technical characteristics:

According to some embodiments of the present disclosure, the busbar body includes a plurality of busbar units arranged at intervals in a front-back direction, each of the busbar units is provided with a locating hole. The first insulating layer is provided with the plurality of reserved holes an at interval in a front-back direction, and the reserved holes and the locating holes are arranged in a one-to-one correspondence manner.

In some embodiments of the present disclosure, two busbar bodies are arranged at an interval in a left-right direction, the two busbar bodies are arranged close to the left and right sides of the first insulating layer respectively, and the second insulating layer is located between the two busbar bodies in the left-right direction.

In some embodiments of the present disclosure, the plurality of reserved holes are separated into two groups, while they are arranged at left and right intervals on the first insulating layer, and the two groups of reserved holes are formed with the two busbar bodies in a one-to-one correspondence manner.

In some embodiments of the present disclosure, the busbar component of the power battery further includes an insulating part, the insulating part being connected with the side of the first insulating layer far away from the battery cell module to cover the reserved holes.

In some embodiments of the present disclosure, the insulating part includes two insulating strips arranged at an interval in a left and right direction, the two insulating strips covering the two groups of reserved holes respectively.

In some embodiments of the present disclosure, the first insulating layer and the second insulating layer are polyester films, and the sampling line is made from aluminum.

In some embodiments of the present disclosure, the busbar assembly and the battery cell module are connected at the reserved hole by laser welding.

According to the second aspect of the present disclosure, the method for processing the busbar component specifically includes the following steps:

S1, arranging the first insulating layer, the busbar body and the second insulating layer of the busbar assembly in sequence in an up-down direction, and forming the locating holes and the reserved holes in a one-to-one correspondence manner;

S2, conducting integral punch forming on the busbar assembly by a punching die;

S3, connecting the busbar assembly with the battery cell module at the reserved holes by the way of laser welding; and S4, connecting the insulating part to the side of the busbar assembly far away from the battery cell module and covering the reserved holes.

According to the method for processing the busbar component of the power battery in the embodiment of the present disclosure, the height of the battery cell module can be reduced, and the busbar component is light and simple in structure and wider in application range. The processing period of the product can be shortened, and the labor cost of a product design is lowered. The busbar component is higher in production efficiency and lower in comprehensive cost. Besides, as the expensive FPC protective film is omitted, the production and assembly processes are simplified, the cost is lower and environmental pollution can be avoided by a mechanical cutting and unloading process.

According to a third aspect of the present disclosure, the power battery of the embodiment of includes battery cell modules, the battery cell modules including a plurality of battery cell modules arranged in sequence in a front-back direction. According to the busbar component of the power battery in the first aspect of the present disclosure, the busbar assembly of the busbar component is correspondingly connected with a plurality of battery cell modules in sequence, and the insulating part of the busbar component is connected to the side of the busbar assembly far away from the battery modules.

According to the present disclosure, by the busbar component of the power battery, the height of the battery cell module can be reduced, and the busbar component is light and simple in structure and wider in application range; the processing period of the product can be shortened, and the labor cost of a product scheme design is lowered. The busbar component is higher in production efficiency and lower in comprehensive cost. Besides, as the expensive FPC protective film is omitted, the production and assembly processes are simplified, the cost is lower and environmental pollution can be avoided by a mechanical cutting and unloading process.

Additional aspects and advantages of the present disclosure will be given partially in the description below, and a part of the additional aspects and advantages will become obvious in the description below or can be understood via practice of the present disclosure.

BRIEF DESCRIPTION OF THE DRAWINGS

The drawings of the description constituting a part of the disclosure are to provide further understanding of the present disclosure. The schematic embodiment and description thereof are used for explaining the present disclosure and do not limit the present disclosure improperly. In the drawings.

Figure 1:
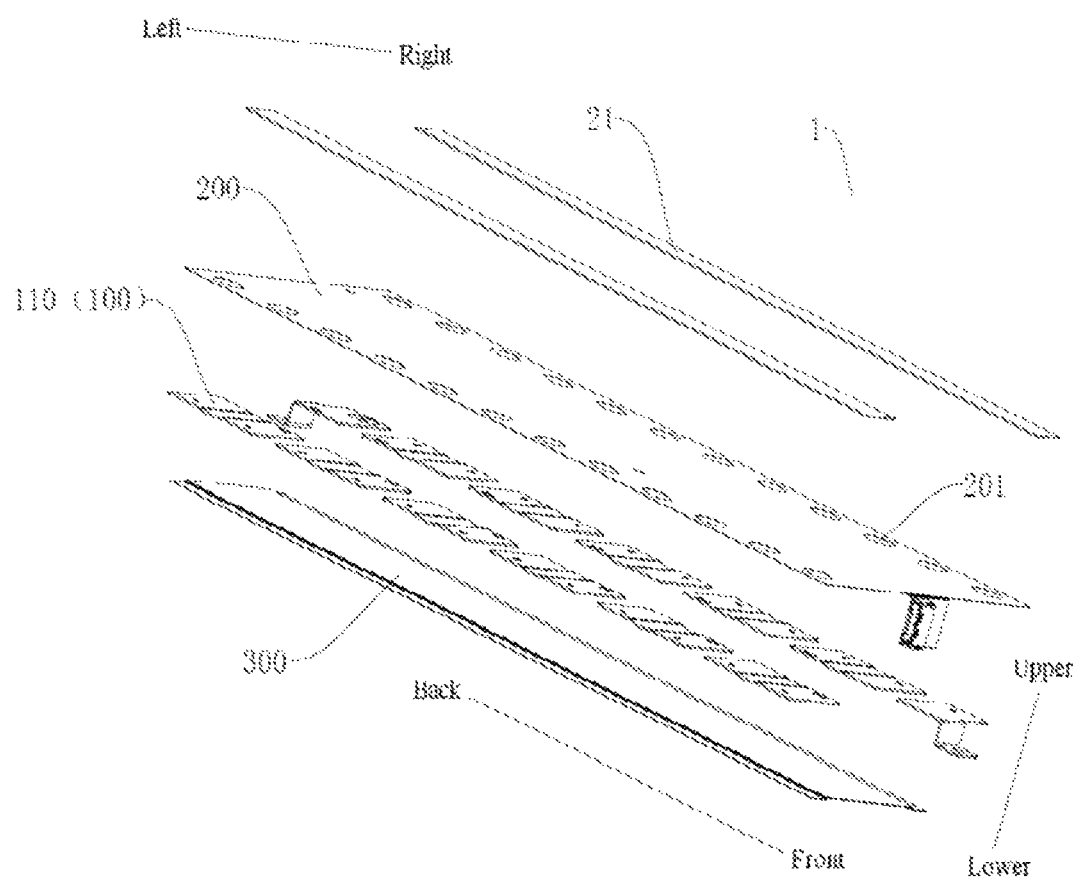
FIG. 1 is an exploded view of the busbar component of the power battery in the embodiment of the present disclosure.

DESCRIPTION OF MARKS OF DRAWINGS busbar component 1, busbar assembly 10, insulating part 20, insulating strip 21, busbar body 100, locating hole 101, busbar unit 110, first insulating layer 200, reserved hole 201, wiring terminal 210, second insulating layer 300.

DETAILED DESCRIPTION OF THE EMBODIMENTS

It should be noted that in the absence of conflict, the embodiments of the present disclosure and features in the embodiments can be combined with one another.

Detail description on the present disclosure will be made below in combination with the drawings and the embodiments.

Figure 2:
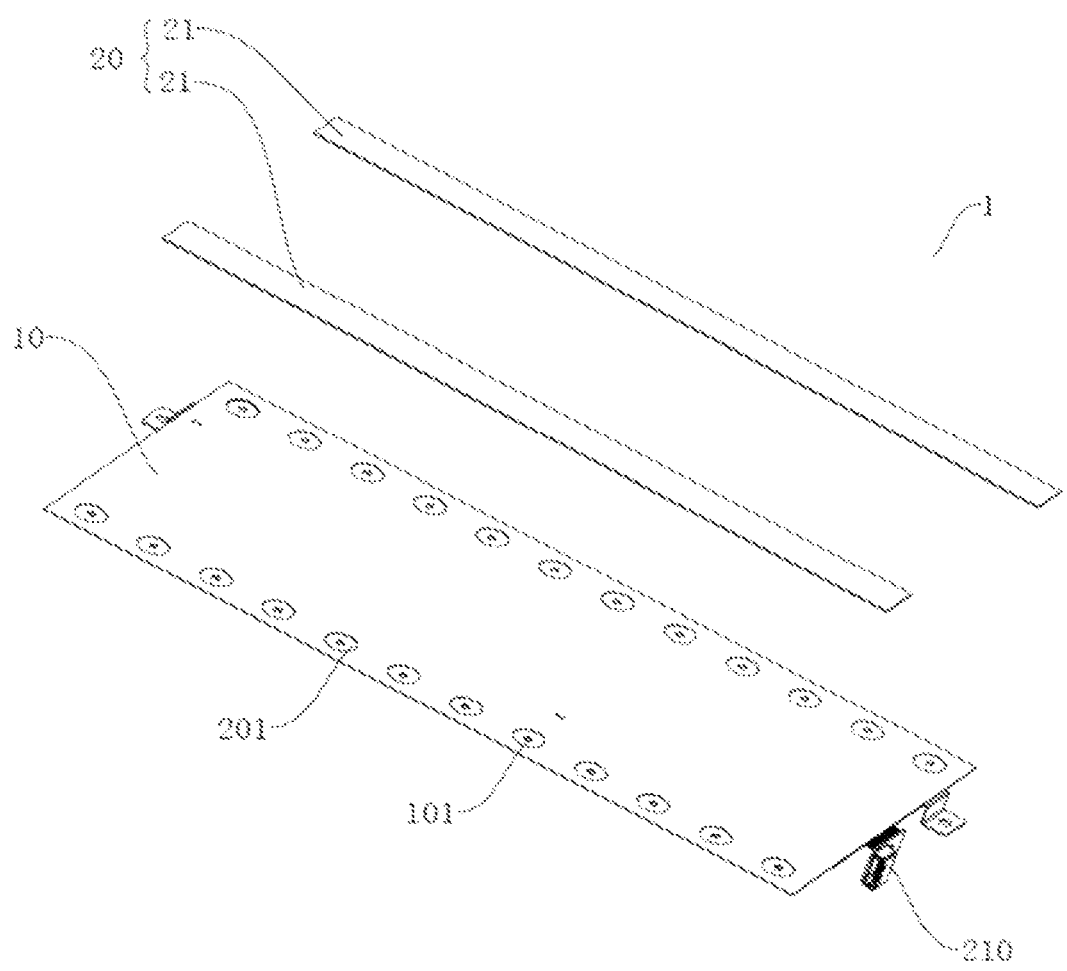
FIG. 2 is a stereogram of the busbar component of the power battery in the embodiment of the present disclosure.
Figure 3:
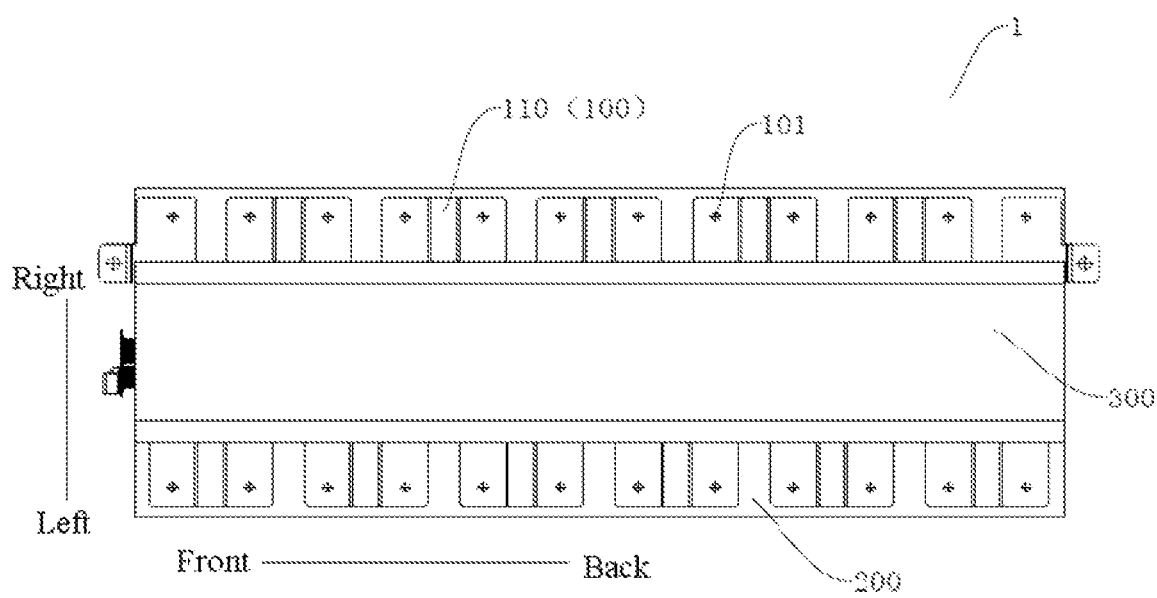
FIG. 3 is a stereogram of the busbar component of the power battery in the embodiment of the present disclosure.

As shown in FIG. 1 to FIG. 3, according to the busbar component 1 of the power battery in the embodiment of the first aspect, the power battery includes a battery cell module (not shown) and a busbar component 1, the busbar component 1 is connected with the battery cell module, the busbar component 1 includes a busbar assembly 10, and the busbar assembly 10 includes a busbar body 100, a first insulating layer 200 and a second insulating layer 300.

Specifically, the busbar body 100 is connected with the side of the first insulating layer 200 facing the battery cell modules, and the first insulating layer 200 is provided with the reserved holes 201. For example, the upper surface of the busbar body 100 can be glued to the lower surface of the first insulting layer 200. As shown in the FIG. 1, the busbar body 100 is located on the lower side of the first insulating layer 200, and the reserved holes 201 penetrate through the upper and lower surfaces of the first insulating layer 200.

The side of the first insulating layer 200 facing the battery cell modules is integrated with the sampling line, and the sampling line is manufactured by the mechanical cutting and unloading process. For example, the lower side of the first insulating layer 200 is integrated with the sampling line, and the sampling line is manufactured by the mechanical cutting and unloading process.

A processing technology of a flexible printed circuit in the related art is usually a liquid medicine etching process, which is prone to polluting the environment, is longer in processing period and complex in processing technology. The sampling line in the embodiment of the present disclosure is manufactured and formed mechanically by the mechanical cutting and unloading process, such that the manufacturing period is shortened and the environment is prevented from being polluted.

The second insulating layer 300 is attached to the first insulating layer 200 and covers the sampling line, the second insulating layer 300 and the busbar body 100 are on the same side of the first insulating layer 200 respectively and are arranged in a staggered manner. For example, the second insulating layer 300 is located on the lower side of the first insulating layer 200, the upper surface of the second insulting layer 300 is glued to the lower surface of the first insulting layer 200, and the sampling line is wrapped between the first insulating layer 200 and the second insulating layer 300, thereby playing an insulating role and guaranteeing normal work of the sampling line.

The flexible printed circuit (i.e., FPC) in the busbar assembly in the related art usually includes a substrate and two layers of FPC protective films. The substrate is packaged and protected by the upper and lower FPC protective films to form the flexible printed circuit. In the assembling process of the flexible printed circuit and the busbar component, the flexible printed circuit and the busbar component are attached together by two layers of connecting films. And thus, as it is needed to paste the films in the packaging and packaging processes to lead to waste of materials, the structure is complex, the cost is higher and the production process is tedious.

Namely, it is further needed to package and protect the upper and lower protective films firstly in the related art and then laminate the flexible printed circuit board and the busbar component together by means of the upper and lower connecting films. In the embodiment of the present disclosure, the sampling line, which is equivalent to the substrate in the flexible printed circuit board in the related art, is integrated directly to the first insulating layer. The first insulting layer is laminated to the second insulting layer to achieve insulation and electric isolation with a peripheral piece. By the way, the two layers of FPC protective films higher in price in the flexible printed circuit board in the related art are directly omitted, so that the cost is lowered greatly. And meanwhile, the production process flow is further saved, and the production efficiency is improved greatly.

Further, according to the busbar component 1 in the embodiment of the present disclosure, the sampling line is directly integrated to the first insulating layer 200. The second insulting layer 300 and the first insulating layer 200 are laminated to cover the sampling line. And meanwhile, the busbar body 100 is directly connected to the first insulating layer 200 without being fixed and supported by the upper cover and the busbar bracket, i.e., the upper cover and the busbar bracket in the busbar assembly in the related art are omitted. Therefore, the structure is simplified greatly. Meanwhile, the height of the battery is further reduced and the occupied space is reduced.

Further, the reserved holes 201 and the busbar body 100 are formed correspondingly, such that the first insulating layer 200 and the busbar body 100 correspond.

The second insulating layer 300 and the busbar body 100 are on the same side of the first insulating layer 200 respectively and are arranged in a staggered manner. It can be understood that at least a part of the busbar body 100 can be exposed on the lower side of the first insulating layer 200 and at least a part of the second insulating layer 300 can be further exposed on the lower side of the first insulating layer 200.

For example, the busbar body 100 and the second insulating layer 300 can be arranged on the lower side of the first insulating layer 200 in parallel. And at the time, the lower surface of the busbar body 100 and the lower surface of the second insulating layer 300 can be exposed; or a part of the busbar body 100 is clamped between the first insulating layer 200 and the second insulating layer 300, and the other part of the busbar body 100 can be exposed; or further, a part of the second insulating layer 300 is clamped between the first insulating layer 200 and the busbar body 100, and the other part of the second insulating layer 300 can be exposed.

According to the busbar component 1 of the power battery of the embodiment of the present disclosure, the first insulating layer 200, the busbar body 100 and the second insulating layer 300 are mounted together to play fixing and insulating roles, and the upper cover and the busbar bracket in the related art are omitted. As a result, the height of the battery cell module is reduced, and the busbar component is light and simple in structure and wider in application range, the processing period of the product can be shortened, and the labor cost of a product scheme design is lowered. The busbar component is higher in production efficiency and lower in comprehensive cost. Besides, the sampling line is packaged and protected by the first insulating layer and the second insulating layer directly, and the expensive FPC protective film is omitted, such that the production and assembly processes are simplified, the cost is lower and environmental pollution can be avoided by means of a mechanical cutting and unloading process.

Optionally, the busbar body 100 can be provided with a positioning structure which can be in structural forms of a hole, a protrusion, a slot and the like. The position of the busbar body 100 on the first insulating layer 200 is determined by means of a corresponding relationship between the positioning structure and the reserved holes 201.

According to some embodiments of the present disclosure, as shown in the FIG. 1, the busbar body 100 includes a plurality of busbar units 110 arranged at intervals in a front-back direction, each busbar unit 110 is provided with a locating hole 101, a plurality of reserved holes 201 are formed at intervals in the front-back direction of the first insulating layer 200, and the reserved holes 201 and the locating holes 101 are formed in a one-to-one correspondence manner. Thus, it is convenient to connect the busbar body 100 with the first insulating layer 200 as the locating holes 101 and the reserved holes 201 are formed correspondingly in an up-down direction, such that it is convenient to weld the busbar body 100 to the battery cell module accurately.

Optionally, the plurality of busbar units 110 can be subjected to integrated injection molding. Thus, the quantity of parts is reduced, and the parts are produced and manufactured conveniently, such that the production efficiency can be improved and the processing period is shortened.

In some embodiments of the present disclosure, two busbar bodies 100 are arranged at intervals in a left-right direction, the two busbar bodies 100 are arranged close to the left and right sides of the first insulating layer 200 respectively, and the second insulating layer 300 is located between the two busbar bodies 100 in the left-right direction.

As shown in the FIG. 1, the busbar body 100, the first insulating layer 200 and the second insulating layer 300 are rectangular pieces, a length direction of the first insulating layer 200 is the front-back direction and a width direction of the first insulating layer 200 is a left-right direction. The busbar body 100 and the second insulating layer 300 are narrower than the first insulating layer 200. In the width direction, a part of the busbar body 100 close to the second insulating layer 300 is clamped between the first insulating layer 200 and the second insulating layer 300.

Thus, a part of the busbar body 100 is clamped between the first insulating layer 200 and the second insulating layer 300 to play roles of mounting and fixing the busbar body 100. The other part of the busbar body 100 is exposed, such that it is convenient to connect the busbar body 100 with the battery cell module.

Further, as shown in the FIG. 2, the plurality of reserved holes 201 are divided into two groups arranged at an interval left and right on the first insulating layer 200, and the two groups of reserved holes 201 are formed with the two busbar bodies 100 in a one-to-one correspondence respectively. For example, the two groups of reserved holes 201 are formed close to the left and right sides of the first insulating layer 200, respectively; each busbar body 100 is provided with a group of locating holes 101 respectively; and the group of reserved holes 201 and the group of locating holes 101 on the same side in the left-right direction are formed in a one-to-one correspondence manner. Thus, interference of the two busbar bodies 100 during mounting is prevented, such that it is convenient to connect the two busbar bodies 100 with the first insulating layer 200 accurately.

In some embodiments of the present disclosure, as shown in the FIG. 2, the busbar component 1 of the power battery further includes an insulating part 20. The insulating part 20 is connected to the side of the first insulating layer 200 far away from the battery cell module to cover the reserved holes 201. For example, the insulating part 20 can be glued to the upper surface of the first insulating layer 200. Thus, electric insulation and protection can be achieved, and the upper cover in the related art is omitted, such that the cost is lowered, the weight is reduced and the structure is simplified.

In some embodiments of the present disclosure, as shown in the FIG. 2, the insulating part 20 includes two insulating strips 21 arranged at an interval in a left and right direction, the two insulating strips 21 covering the two groups of reserved holes respectively 201. For example, the two insulating strips 21 are arranged close to the left and right sides of the first insulating layer 200, and the length directions of the two insulating strips 21 are oriented along the front-back direction respectively. Thus, the waste of raw materials can be avoided, the utilization ratio is higher, the cost is lower, the weight is lighter and the structure is simpler.

Optionally, as shown in the FIG. 2, the insulating strips 21 can be foam strips. Thus, a noise caused by the vibration of the upper cover of the battery pack is buffered and reduced, and the weight can be further alleviated and the cost can be further lowered.

The flexible printed circuit board in the related art usually takes copper as the substrate, so that the cost is higher.

Therefore, in some embodiments of the present disclosure, the first insulating layer 200 and the second insulating layer 300 are polyester films, and the sampling line is made from aluminum. Thus, compared with a conventional copper substrate flexible printed circuit board, the cost of the aluminum substrate sampling line can be lowered by about one third, and therefore, the cost is lower.

Further, as shown in the FIG. 2, the first insulating layer 200 is provided with the wiring terminal 210, one end of the wiring terminal 210 is connected with the sampling line, and the other end of the wiring terminal 210 is connected with the battery management system (i.e., BMS), such that it is convenient to transfer a measured voltage to the battery management system.

In some embodiments of the present disclosure, as show in the FIG. 2, the busbar assembly 10 and the battery cell module are connected at the reserved hole 201 by laser welding. Thus, precise and quick welding can be conducted to prevent other parts and components from being affected, and the welding effect is good, and the welded structure is relatively stable.

According to the busbar component 1 of the power battery of the embodiment of the present disclosure, the upper cover and the busbar bracket are omitted directly. Compared with a conventional 355 module, the weight can be reduced by about 100 g and the cost can be lowered by about 6 CNY. A copper material is replaced by an aluminum material as the substrate of the flexible printed circuited board, so the environment can be prevented from being polluted, the cost can be lowered by about 5 CNY, the design working hour of the busbar bracket can be saved by about 40 hours, and the delivery time of a product can be further shortened by about one third. Besides, the height of the module can be lowest, and compared with the conventional 355 module, the weight and the comprehensive cost can be reduced by about 15%.

In conclusion, according to the busbar component 1 of the power battery in the embodiment of the present disclosure, the upper cover and the busbar bracket in the battery pack in the related art are omitted, so that the structure is simplified greatly, the structure is light in weight, the cost is lowered, the production period is saved, the height of the battery module is reduced and the occupied space is saved. By using the aluminum material as the substrate of the sampling line, the weight of the busbar component 1 is further reduced.

As shown in the FIG. 1 to FIG. 3, according to the busbar component 1 of the embodiment of the first aspect specifically 1, the method for processing the busbar component 1 of the power battery of the embodiment of a second aspect specifically includes the following steps:

First, the first insulating layer 200, the busbar body 100 and the second insulating layer 300 are arranged in sequence along the up-down direction, and the locating holes 101 and the reserved holes 201 are formed in a one-to-one correspondence manner. For example, the busbar body 100 includes a plurality of busbar units 110, wherein the center axis of the locating hole 101 and the center axis of the corresponding reserved hole 201 are overlapped, and therefore, the plurality of busbar units 110 are connected to the lower side of the first insulating layer 200 accurately. Then, the first insulating layer 200, the busbar body 100 and the second insulating layer 300 are subjected to punch forming to form an integrated part by a punching die, and the integrated part is formed as the busbar assembly 10. A part of the plurality of busbar bodies 110 close to the second insulating layer 300 is clamped between the first insulating layer 200 and the second insulating layer 300.

Then, the busbar assembly 10 and the battery cell module are connected at the reserved holes 201 by way of laser welding. For example, the battery cell module is placed below the busbar assembly 10, and laser welding is conducted above the busbar assembly 10 along a circumferential direction in the reserved holes 201, such that the busbar body 100 and the battery cell module are electrically connected. Finally, the insulating part 20 is connected to the side of the busbar assembly 10 far away from the battery cell module and covering the reserved holes 201 to achieve electric insulation.

According to the busbar component of the power battery of the embodiment of the present disclosure, the height of the battery cell module can be reduced, and the busbar component is light in structure. The processed busbar component 1 is simple in structure and wider in application range, the processing period of the product can be shortened, and the labor cost of a product scheme design is lowered. The busbar component is higher in production efficiency and lower in comprehensive cost. Besides, as the expensive FPC protective film is omitted, the production and assembly processes are simplified, the cost is lower and environmental pollution can be avoided by means of a mechanical cutting and unloading process.

As shown in the FIG. 1 to FIG. 3, the power battery according to the embodiment of the third aspect specifically includes the battery cell module and the busbar component 1 of the power battery according to the embodiment of the first aspect of the prevent disclosure.

Specifically, the plurality of battery cell modules are arranged in sequence in a front-back direction. The busbar assembly (10) of the busbar component (1) is correspondingly connected with battery cell modules in sequence, and the insulating part (20) of the busbar component (1) is connected to the side of the busbar assembly (10) far away from the battery modules. For example, the battery cell modules are connected to the lower side of the busbar body 100, the busbar body 100 includes the plurality of busbar units 110, and the plurality of battery cell modules are connected with the plurality of busbar units 110 in a one-to-one correspondence manner.

According to the busbar component of the power battery of the embodiment of the present disclosure, by means of the busbar component of the power battery, the height of the battery cell module can be reduced, and the busbar component is light and simple in structure and wider in application range, the processing period of the product can be shortened, and the labor cost of a product scheme design is lowered. The busbar component is higher in production efficiency and lower in comprehensive cost. Besides, as the expensive FPC protective film is omitted, the production and assembly processes are simplified, the cost is lower and environmental pollution can be avoided by means of a mechanical cutting and unloading process.

The above mentioned is merely the preferred embodiment of the present disclosure and is not used to limit the present disclosure. Any modification, equivalent replacement, improvement, etc. made within the spirit and principle of the present disclosure shall be regarded as within the protection scope of the present disclosure.

What is claimed is:

1. A busbar component of a power battery, the power battery comprises at least one battery cell module and a busbar component, the busbar component is connected with the at least one battery cell module and comprises a busbar assembly, the busbar assembly comprising:
    a busbar body;
    a first insulating layer, the busbar body being connected with a side of the first insulating layer facing the at least one battery cell module, the first insulating layer being provided with a reserved hole, the side of the first insulating layer facing the at least one battery cell module being integrated with a sampling line, and the sampling line being manufactured by a mechanical cutting and unloading process; and
    a second insulating layer, the second insulating layer being attached to the first insulating layer and covering the sampling line, the second insulating layer and the busbar body being on a same side of the first insulating layer and being arranged in a staggered manner, and the reserved hole and the busbar body being arranged correspondingly;
    wherein two busbar bodies are arranged at an interval in a left-right direction, the two busbar bodies are arranged close to left and right sides of the first insulating layer respectively, and the second insulating layer is located between the two busbar bodies in the left-right direction.

2. The busbar component of a power battery according to claim 1, wherein the busbar body comprises a plurality of busbar units arranged at an interval in a front-back direction, each of the busbar units is provided with a locating hole, the first insulating layer is provided with a plurality of reserved holes at intervals in a front-back direction, and the reserved holes and the locating holes are arranged in a one-to-one correspondence manner.

3. The busbar component of a power battery according to claim 1, wherein a plurality of reserved holes are separated into two groups, while they are arranged at left and right intervals on the first insulating layer, and the two groups of reserved holes are formed with the two busbar bodies in a one-to-one correspondence manner.

4. The busbar component of a power battery according to claim 3, wherein the busbar component of the power battery further comprises an insulating part, the insulating part being connected with a side of the first insulating layer far away from the at least one battery cell module to cover the reserved holes.

5. The busbar component of a power battery according to claim 4, wherein the insulating part comprises two insulating strips arranged at an interval in a left and right direction, the two insulating strips covering the two groups of reserved holes respectively.

6. The busbar component of a power battery according to claim 1, wherein the first insulating layer and the second insulating layer are polyester films, and the sampling line is made from aluminum.

7. The busbar component of a power battery according to claim 1, wherein the busbar assembly is connected with the at least one battery cell module at reserved holes provided in the first insulating layer by means of laser welding.

8. The busbar component of a power battery according to claim 2, wherein two busbar bodies are arranged at an interval in a left-right direction, the two busbar bodies are arranged close to left and right sides of the first insulating layer respectively, and the second insulating layer is located between the two busbar bodies in the left-right direction.

9. The busbar component of a power battery according to claim 8, wherein the plurality of reserved holes are separated into two groups, while they are arranged at left and right intervals on the first insulating layer, and the two groups of reserved holes are formed with the two busbar bodies in a one-to-one correspondence manner.

10. The busbar component of a power battery according to claim 9, wherein the busbar component of the power battery further comprising an insulating part, the insulating part being connected with a side of the first insulating layer far away from the battery cell module to cover the reserved holes.

11. The busbar component of a power battery according to claim 10, wherein the insulating part comprises two insulating strips arranged at an interval in a left and right direction, the two insulating strips covering the two groups of reserved holes respectively.

12. The busbar component of a power battery according to claim 2, wherein the busbar assembly is connected with the battery cell module at the reserved holes by means of laser welding.

13. The busbar component of a power battery according to claim 3, wherein the busbar assembly is connected with the battery cell module at the reserved holes by means of laser welding.

14. The busbar component of a power battery according to claim 4, wherein the busbar assembly is connected with the battery cell module at the reserved holes by means of laser welding.

15. The busbar component of a power battery according to claim 5, wherein the busbar assembly is connected with the battery cell module at the reserved holes by means of laser welding.

16. The busbar component of a power battery according to claim 6, wherein the busbar assembly is connected with the battery cell module at the reserved holes by means of laser welding.

17. A method for processing the busbar component of a power battery according to claim 2, wherein the busbar component of the power battery further comprises an insulating part, the method specifically comprises the following steps:
- S1, arranging the first insulating layer, the busbar body and the second insulating layer of the busbar assembly in sequence in an up-down direction, and forming the locating holes and the reserved holes in a one-to-one correspondence manner;
- S2, conducting integral punch forming on the busbar assembly by a punching die;
- S3, connecting the busbar assembly with the at least one battery cell module at the reserved holes by the way of laser welding; and
- S4, connecting the insulating part to a side of the busbar assembly far away from the at least one battery cell module and covering the reserved holes.

18. A power battery, comprising:
- battery cell modules, the battery cell modules comprising a plurality of battery cell modules arranged in sequence in a front-back direction; and
- the busbar component according to claim 1, the busbar assembly of the busbar component being correspondingly connected with the plurality of battery cell modules in sequence, and the insulating part of the busbar component being connected to a side of the busbar assembly far away from the battery modules.

19. A power battery according to claim 18, wherein the busbar body comprises a plurality of busbar units arranged at an interval in a front-back direction, each of the busbar units is provided with a locating hole, the first insulating layer is provided with a plurality of reserved holes at intervals in a front-back direction, and the reserved holes and the locating holes are arranged in a one-to-one correspondence manner.

* * * * *